United States Patent [19]
Dowd

[11] 4,270,054
[45] May 26, 1981

[54] POWER PLANT

[76] Inventor: Norton W. Dowd, 4283 Turner Rd., Prince George, B.C., Canada, V2K 2J5

[21] Appl. No.: 143,878

[22] Filed: Apr. 25, 1980

[51] Int. Cl.$^3$ ............................................. H02K 33/00
[52] U.S. Cl. .................................. 290/4 R; 290/1 R; 310/15
[58] Field of Search .................. 290/40, 1 R; 310/15, 310/17, 30

[56] References Cited

U.S. PATENT DOCUMENTS

| | | | |
|---|---|---|---|
| 1,785,643 | 12/1930 | Noack et al. | 310/30 |
| 2,362,151 | 8/1943 | Ostenberg | 290/1 R |
| 3,105,153 | 9/1963 | James, Jr. | 310/30 |
| 3,206,609 | 9/1965 | Dawes | 310/15 |

*Primary Examiner*—J. V. Truhe
*Assistant Examiner*—D. L. Rebsch
*Attorney, Agent, or Firm*—William C. Babcock

[57] ABSTRACT

A power plant for generating electrical power comprises opposed piston assemblies each at the end of a rack and pinion mechanism conformed to pass through a linear inductor. Thus on each piston firing stroke the linear translation of the rack is used to produce electrical power. This is achieved by an interdigitated magnetic structure attached to each rack. In this manner a linear inductor is utilized to take benefit of each stroke in the course of generating electricity. Each pair of opposed pistons includes its own throttle control system, thus allowing for convenient balancing of the total power. The throttle control system operates a mixture mechanism which combines combustion air with fuel and water to form a charge which is injected into the firing chamber.

5 Claims, 10 Drawing Figures

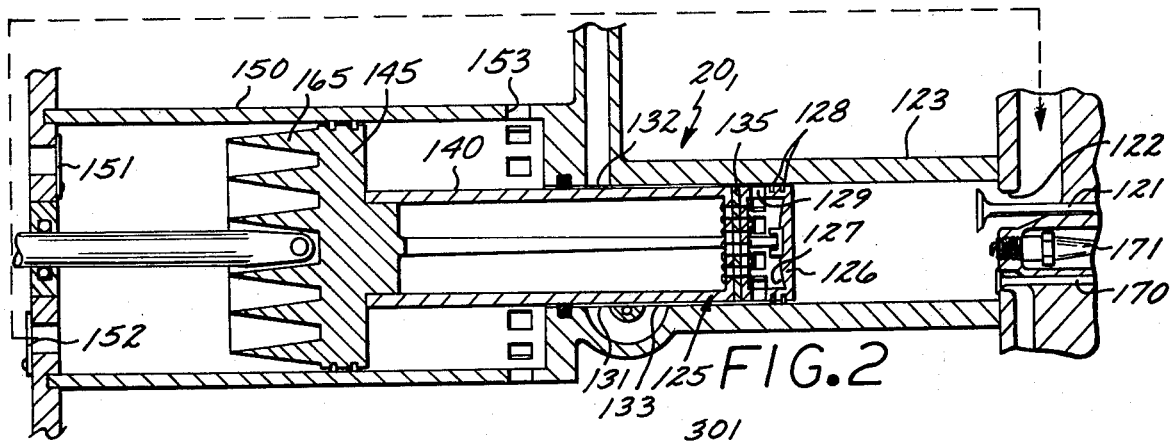
FIG.2
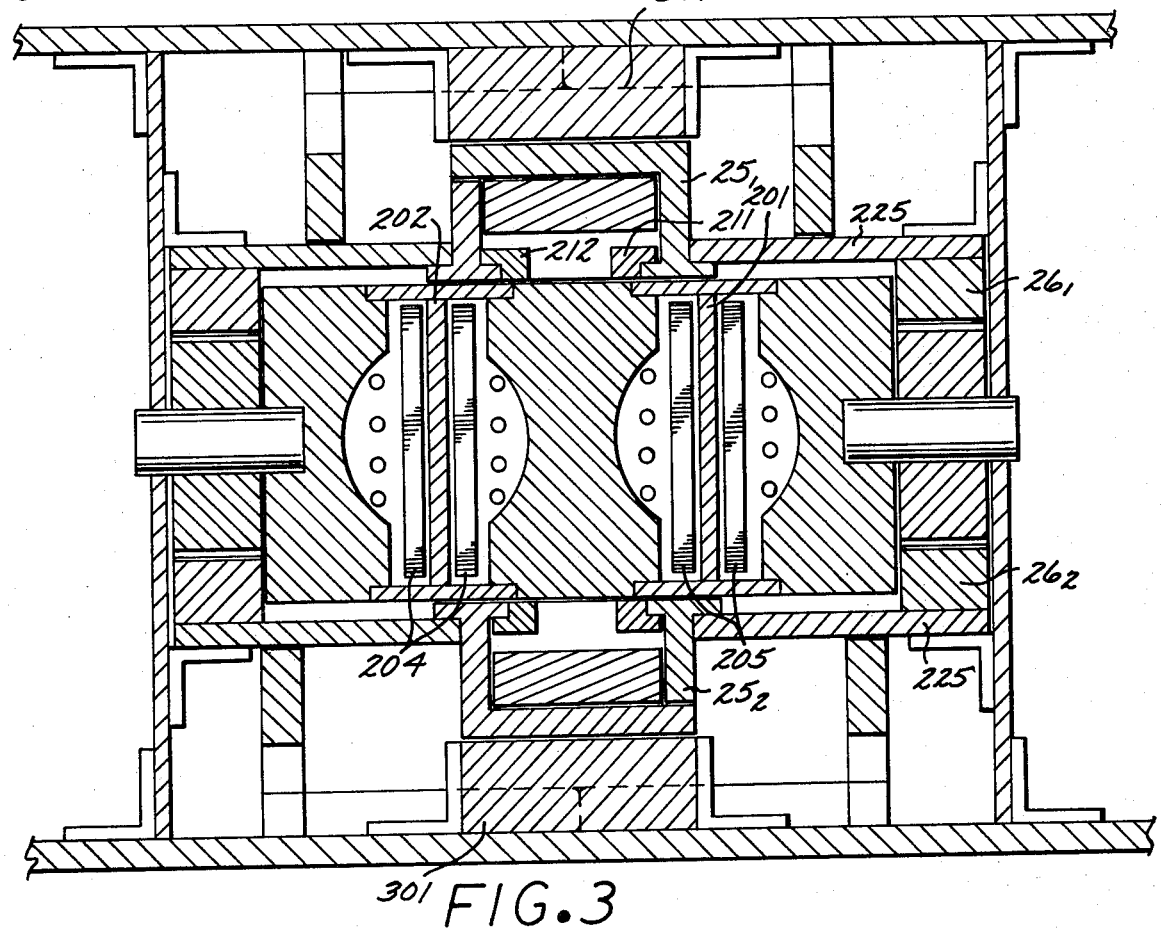
FIG.3
FIG.4
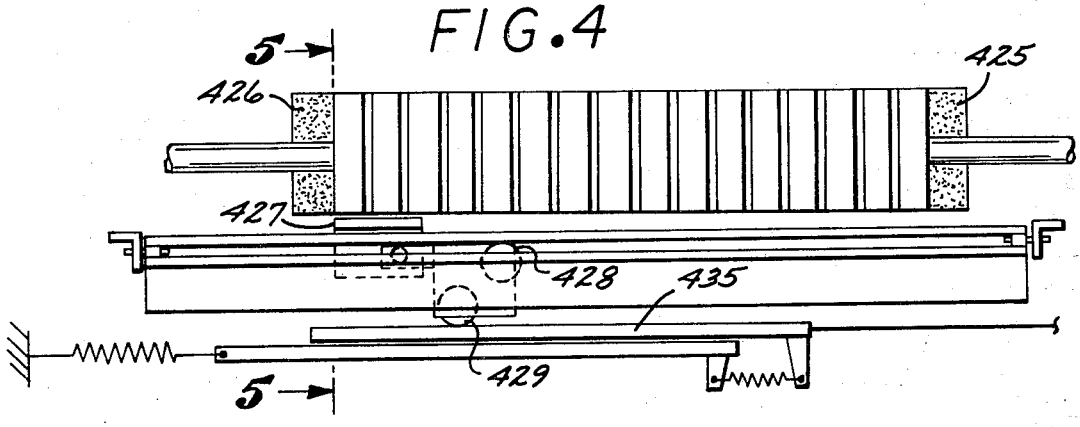

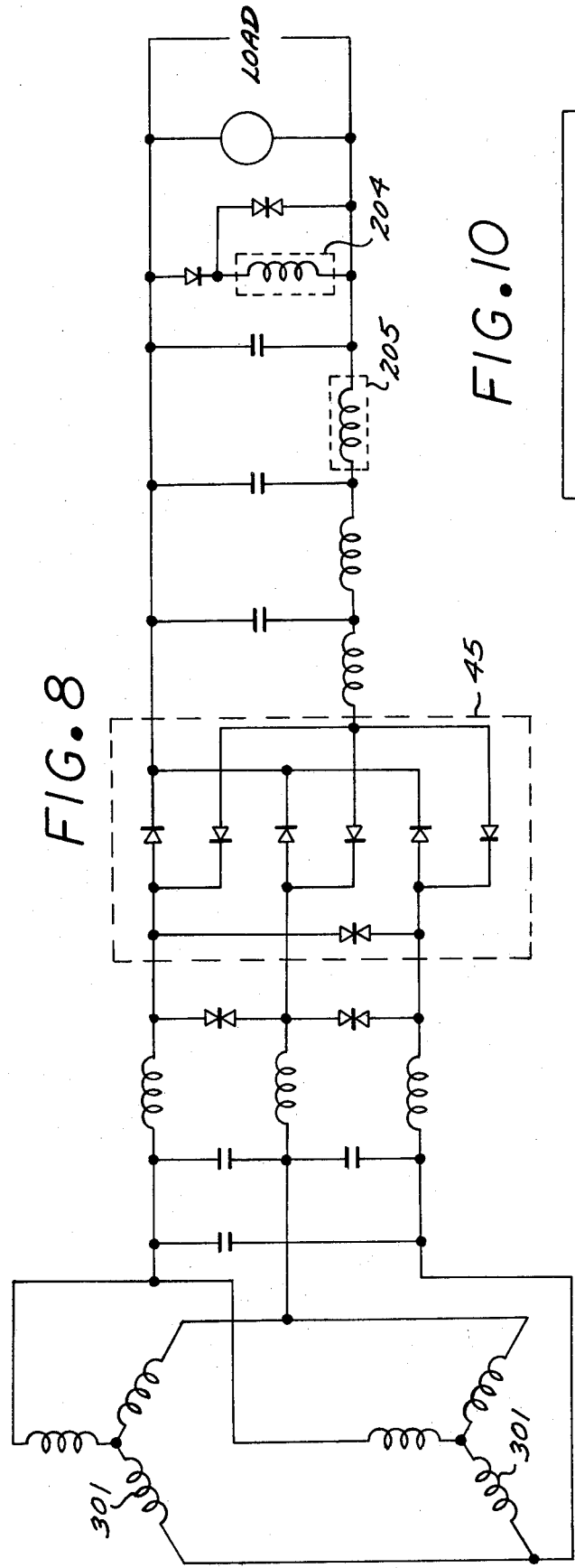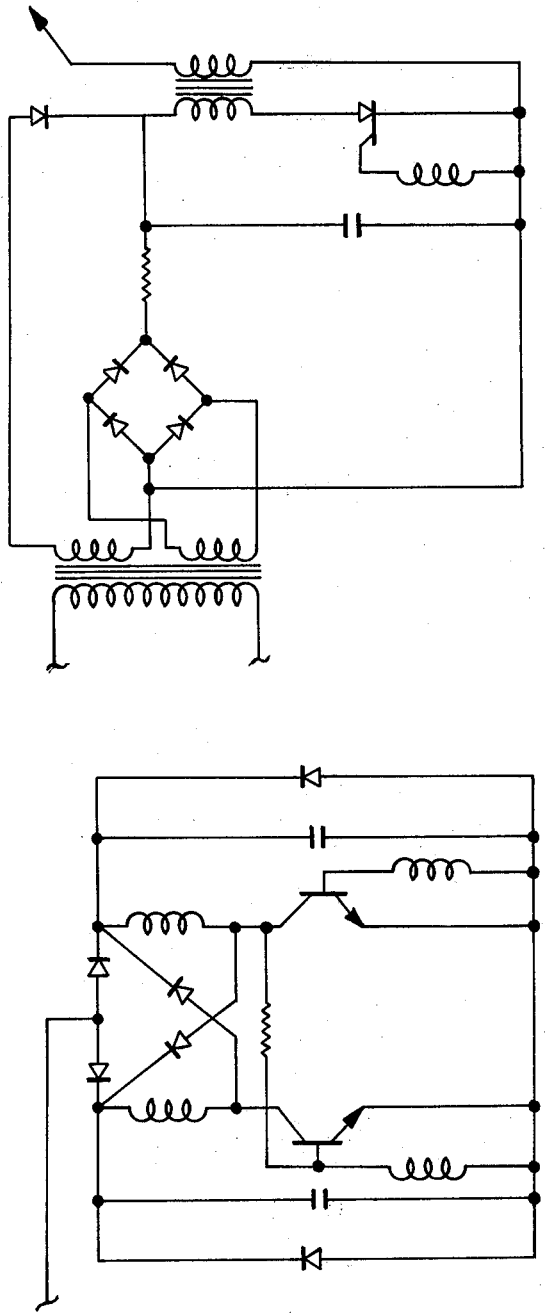
FIG. 8
FIG. 9
FIG. 10

POWER PLANT

BACKGROUND OF THE INVENTION

1. Field of the Invention

The present invention relates to electrical power generators, and more particularly to an internal combustion engine conformed to articulate a linear inductor.

2. Description of the Prior Art

Electrical power generators have been known in the past. Typically, internal combustion engines were used to produce electrical power, typically including the articulation of pistons within valve cylinders. Heretofore best efficiencies have been realized in the course of what is known as a four-stroke cycle while best power-to-weight ratios are realized in two-stroke cycles. The better fuel efficiencies available in the four-stroke cycle are primarily due to the length of each stroke, the well-known long stroke engine giving the best results. Four-stroke cycles, however, entail many cycle segments which do not produce power. Thus four-stroke cycle engines are best used in a multiple piston arrangement, complicating weight and parts count. Two-stroke engines while quite efficient in their power-to-weight ratio operate well only at high rates and thus are known to be "peaky".

These physical constraints have heretofore dictated generating power plants to very specific configurations both quite complex and limited and useable load range. It is particularly these two deficiencies that have been the source of customer dissatisfaction, where a generator one size has been quite often found unsuitable for other lesser or heavier uses. It is this exact problem that the present invention solves.

Furthermore, conversion efficiencies of 15-40% heretofore realized are inadequate under todays cost of fuel. Efficiency increases to 60-80% in a structure built for extended lifespan is a further feature of the invention herein.

SUMMARY OF THE INVENTION

Accordingly, it is the general purpose and object of the present invention to provide a long stroke power arrangement for generating electricity which develops electrical power in multiple sections of each stroke.

Other objects of the invention are to provide an electrical power generator which does not entail the use of cranks and other rotary devices for direct conversion of the power stroke into electrical energy.

Yet additional objects of the invention are to provide an electrical power generator which has a wide range of applications.

Briefly, these and other objects are accomplished within the present invention by providing two opposed piston sets each translating or sliding within two opposed cylinder sets, each piston including a power end and a charging end, the charging end being utilized to advance a mixture of air, fuel and water into the power cylinder. The opposed pistons are connected in common by way of an interdigitated field which is disposed on two sides of a pinion to synchronize the strokes. These interdigitated fields pass through an inductor loop, providing a multiple set of power cycles in each stroke. This same stroking arrangement can be used to manipulate control valves which control the ingestion and the exhausting of gases in the power cylinders.

BRIEF DESCRIPTION OF THE DRAWINGS

FIG. 2 is a sectional view of one piston assembly useful with the invention herein;

FIG. 3 is a sectional view taken along line 3—3 of FIG. 1 illustrating the implementation of a linear induction arrangement useful with the invention herein;

FIG. 4 is a detailed diagram, in side view, illustrating the control arrangement useful with the invention herein;

FIG. 8 is a circuit diagram useful in rectifying the plural phases of power generated by the invention herein;

FIG. 9 is yet another circuit diagram useful in storing energy entailed in a discharge of the field disclosed herein; and FIG. 10 is a further circuit diagram illustrating the capacitive discharge system useful in igniting the fuel charge disclosed herein.

DESCRIPTION OF THE SPECIFIC EMBODIMENT

Figure 1:
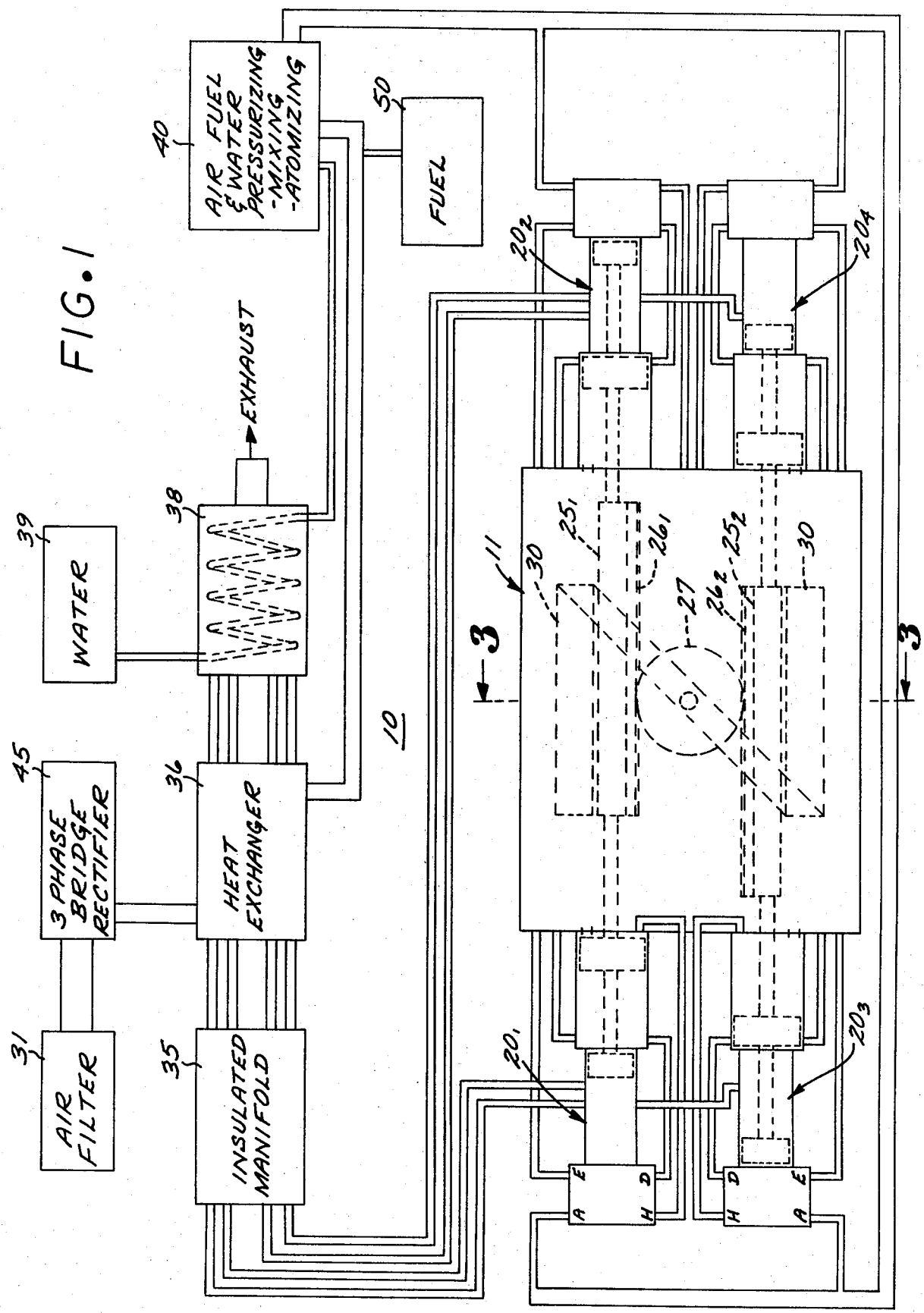
FIG. 1 is a diagrammatic illustration of a generator assembly constructed according to the invention herein.

As shown in FIG. 1 the inventive electrical generator, designated by the numeral 10, comprises a generator, designated by the numeral 10, comprises a generating stage 11 disposed between two paired sets of opposed piston assemblies respectively designated as piston assemblies $20_1$ through $20_4$. In this configuration for the purposes of clarity, the odd number piston assemblies $20_1$ and $20_3$ are shown on the left hand side of the charging system while the even numbered piston assemblies $20_2$ and $20_4$ are shown on the right side. Piston assemblies $20_1$ and $20_2$ are arranged in opposition extending through the interior of the electrical generating stage 11 and joined therein at opposed ends of an interdigitated magnetic structure $25_1$. Similarly piston assemblies $20_3$ and $20_4$ are arranged in opposition across an interdigitated magnetic structure $25_2$. The interdigitated magnetic structures $25_1$ and $25_2$ are provided with racks at the adjacent sides thereof, shown as racks $26_1$ and $26_2$, each of the racks engaging the periphery of a central pinion 27. Thus, advancement of rack $26_1$ will immediately produce an opposite advancement of rack $26_2$. The paired piston assemblies therefore operate in synchronized opposition, thus balancing the load and vibration in the course of their operation. The interdigitated fields or magnetic structures $26_1$ and $26_2$ are disposed within the interior of a linear inductor assembly 30 and it is this linear inductor that provides electricity.

As will be shown hereinafter the foregoing piston assemblies are connected by way of a plurality of tubular conduits for ingestion of air, fuel and water. This ingestion is further accompanied by the ejection of exhaust gases into an insulated manifold assembly 35 which is connected to a heat exchanger 36 for preheating air coming from an air filter 37, the same air being directed to a carburetor assembly 40. The exhaust gases coming out of the heat exchanger 36 are passed through a further heat exchanger 38 which preheats a water conduit between a water container 39 and the carburetor 40. Thus both water and air are preheated by the exhaust gases, the air filter outlet furthermore including provisions for cooling a bridge rectifier assembly 45 used to rectify the power generated in the electrical generation stage 11. This preheated air and water are mixed with fuel contained in a fuel tank 50 in the carburetor assembly 40 and it is then conveyed to the foregoing piston assembly $20_1$ through $20_4$.

As shown in FIG. 2 each one of the piston assemblies is similarly constructed and the example shown herein is applicable to all four. Thus as shown in this figure, piston assembly $20_1$, by example, includes an air valve 121 deployed to articulate in a valve seat 122 at the top of a compression cylinder 123. Disposed to slide within the compression cylinder 123 is a firing piston assembly 125 comprising a piston head 126 provided with a hollow interior shown by way of a cavity 127 and a ring set 128. Cavity 127, on the underside of rings 128 includes a plurality of communicating ports 129 extending radially through the walls of the piston head 126. It is these ports 129 that establish a communication path between the contained cavity in cylinder 123 and an exhaust manifold. More specifically shown proximate the bottom end of cylinder 123 is a set of opposed ports 131 and 132, port 132 communicating with the exhaust line while port 131 is looped around to a port 133 further upward along the piston stroke. Thus when the cavity 127 and concurrently the ports 129 align with ports 131 and 132 a communication path is established between the exposed port 133 and the exhaust manifold. This allows the cylinder cavity to be exhausted and to receive new charges of air and fuel and water.

Cylinder head assembly 126 is connected across a ceramic spacer 135 to a tubular connector 140 which terminates in yet another piston 145. Piston 145, of a larger section than piston head 126, slides within an air compression cylinder 150 concurrent with the articulation of the firing piston 125. The cavity subjacent piston 145 is used to compress air which is received through a reed valve 151 during the upward stroke of the piston and which is ejected through a reed valve 152 into the port 122 closed by valve 121. The cavity above piston 145, on the other hand, is used to atomize oil received through a plurality of lateral ports 153 which by virtue of the varying pressure levels will produce oil mist. It is this oil mist that impinges on the walls of the connecting tube 140 and it is this same oil that is used to lubricate the walls of cylinder 123. Piston 145 may be further provided with a plurality of fins in the underside thereof shown as fins 165 which both control heat exchange and control compression.

As will be appreciated from the foregoing illustration the cavity of cylinder 150 is substantially larger than the cavity of cylinder 123. Thus the volumetric compression of the air subjacent piston 145 will be substantially larger than the expansion of the air associated with the downward motion of piston head 126. Accordingly, a purging flow of air is available which may be introduced through port 122 at the appropriate time selected by the opening of the valve 121. This purging flow of air will occur immediately prior to the recharge of the fuel air and water mixture through yet another fuel valve 170. By selecting appropriate pressure levels in the inlet side of valve 170 it is thus possible to produce a power plant which fires on each stroke. This multiplied power stroke production can be used to advantage to articulate the foregoing interdigitated fields to produce electricity. More specifically, piston 145, at the underside thereof, connects to a connecting rod which in turn attaches to the interdigitated field $25_1$. As shown in FIG. 3, field $25_1$ completes the loop across two core pieces 201 and 202 laid in parallel within the chamber of the electrical generating assembly 11 and arranged in a direction along the direction of motion of the interdigitated fields. Similarly field $25_2$ is disposed across the other ends of the core pieces 201 and 202 completing the loop. Each of the interdigitated fields $25_1$ and $25_2$ is constructed in the manner as shown in FIG. 7. Thus each interdigitated field comprises a plurality of parallel and transversely laid north-south segments labeled by N and S respectively, and it is these segments N and S that are translated adjacent the laminated three phase segments of a stationary stator 301 shown in FIG. 6. This same stationary stator 301 includes laminated segments deployed adjacent the translation path of the interdigitated fields $25_1$ and $25_2$. Field $25_1$ and $25_2$ are furthermore tied by way of rack supports $225_1$ and $225_2$ to the aforementioned rack $26_1$ and $26_2$. These racks are deployed on both sides of the generator cavity and act on the pinned pinion gear 27.

In order to induce a magnetic flux onto the interdigitated fields $25_1$ and $25_2$ core pieces 202 and 201 are aligned within inductive windings 204 and 205 respectively. It is in these windings that the EMF reversals generate the power. At the same time the laminated stators 301 are connected in parallel across the full wave bridge rectifier 45, arranged for three phase rectification, which is connected in circuit with capacitive and inductive elements for suppressing noise.

Figure 6:
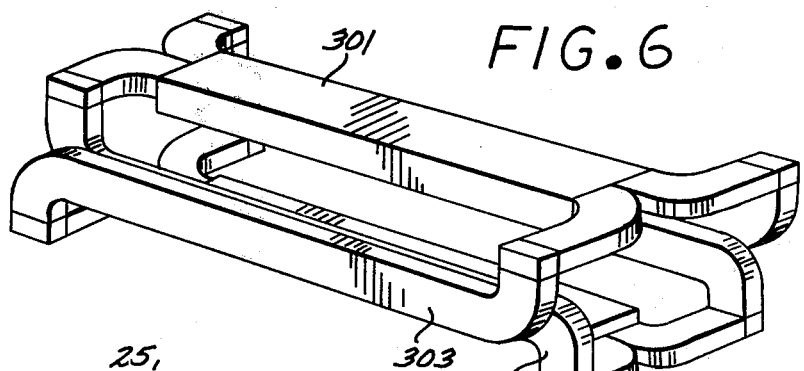
FIG. 6 is a perspective illustration of an inductor arrangement useful with the invention herein.
Figure 7:
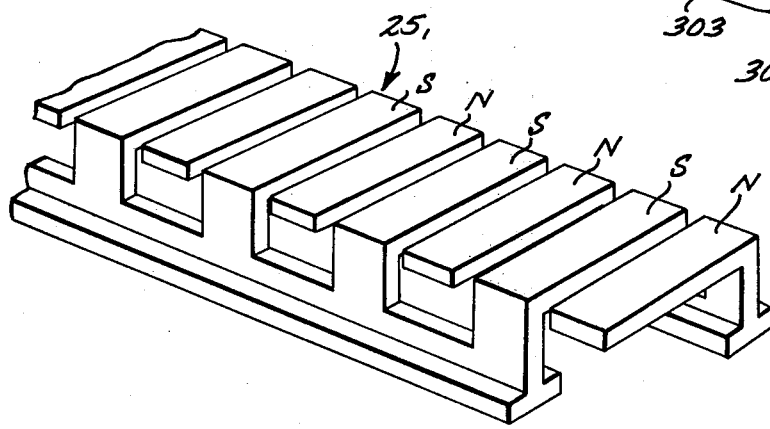
FIG. 7 is a perspective illustration of one detail portion of an interdigitated magnetic structure useful with the invention herein.

As shown in FIG. 6 the series interconnection of the two laminated stators 301 is achieved by way of laminated steel paths completing the magnetic circuit. Thus, for example, the upper laminated stators 301 connect to the lower alternator stator in a forward to reverse connection and the lower alternator stator is arranged in an opposite direction. This interconnection is achieved by way of return side sections 303 and 304, providing the necessary magnetic polarities which are associated with the opposed directions of motion of the two interdigitated fields.

Figure 5:
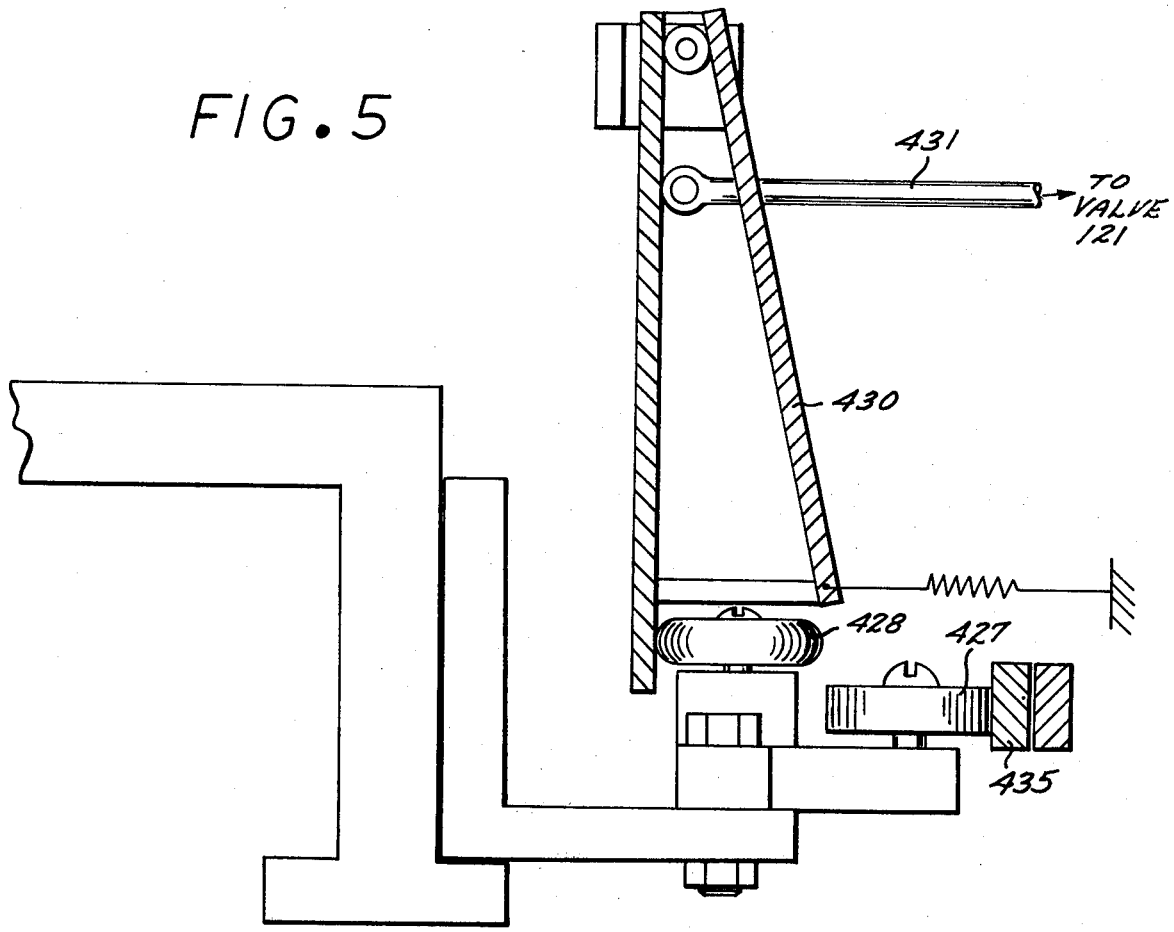
FIG. 5 is yet another detailed view of a control feature useful with the invention herein.

It is to be understood that the foregoing structure may include the necessary hardware provisions for retaining the sliding articulation of the interdigitated fields, such as that shown in FIG. 4. For example the ends of the interdigitated fields $25_1$ or $25_2$ or both may be provided with elastic bumpers to limit the excursion thereof. These bumpers are shown as bumpers 425 and 426 at the end of the interdigitated field. Similarly as shown in FIG. 3 the interface between the sliding interdigitated fields and the stationary core pieces 201 and 202 may be improved by an expanded shoe implementation of the field bottom edges. This shoe implementation may be retained in channels 211 and 212 which thus guide the sliding articulation of the fields. Concurrently, referring back to FIG. 4, the interdigitated field may be connected to a control bracket 427 which supports a roller type of cam follower 428 and 429 aligned to trigger a valve unlatching mechanism shown in detail in FIG. 5. More specifically, cam follower 428 as it progresses along with the interdigitated field, advances to a point over the air and fuel throttle rods where it intercepts a pivoted bracket 430 arranged as a bell crank to articulate a push rod 431 connected to valve 121. This, however, will occur only upon the advancement of roller 429 along a throttle control rod 435 which is manipulated according to demand. Accordingly, the timing of the opening of air valve 121 occurs in coherent relationship with the opening of the throttle control. Referring back to FIG. 2, this timing may be synchronized with the firing of a spark plug 171 in the top of the compression cylinder 123. Spark plug 171 may be variously ignited, a preferred capacitive discharge circuit therefor being shown in FIG. 10.

By virtue of the foregoing arrangement of parts the opposed cylinder structure is conformed which does not require the use of a crank and the associated inertia forces and losses incident thereto. Furthermore the opposed strokes of the paired pistons counterbalance each other and most of the stroke terminal energy or the slow down of the piston assembly at the ends of each stroke is accomplished by the compression cycle incident. Thus only minimal occurrences of overtravel which must be absorbed in the flexible bumpers occur.

Obviously many modifications and changes may be made to the foregoing description without departing from the spirit of the invention. It is therefore intended that the scope of the invention be determined solely on the claims appended hereto.

What is claimed is:

1. An electrical generator assembly, comprising:
   a first pair of opposed piston assemblies connected for common reciprocal articulation;
   a second pair of opposed piston assemblies connected for common reciprocal articulation;
   gearing means connected between said first and second pairs of opposed piston assemblies for providing opposing interconnection therebetween;
   a first and second set of interdigitated pole pieces respectively connected to said first and second pairs of opposed cylinder assemblies;
   a stator disposed proximate said first and second sets of pole pieces for electromagnetic induction; and
   a winding connected for electric excitation to said stator and aligned to produce magnetic forces in said first and second sets of pole pieces.

2. Apparatus according to claim 1 wherein:
   said first and second cylinder assemblies each include telescopically received piston assemblies and fuel and air feed means connected to said cylinder assemblies for supplying thereto air and fuel according to the telescopic position of said piston assemblies.

3. Apparatus according to claim 2 further comprising:
   firing means connected to said first and second cylinder assemblies for igniting said air and fuel according to the position of said piston assemblies.

4. Apparatus according to claim 3 wherein:
   each said first and second cylinder assemblies comprises a firing cylinder of tubular section and an axially aligned charging cylinder of a tubular section greater than the tubular section of said first firing cylinder.

5. Apparatus according to claim 4 wherein:
   said first and second piston assemblies each comprise a firing piston adapted for translation in said firing cylinder and a charging piston adapted for translation in said charging cylinder, said firing and charging pistons being connected to each other.

* * * * *